United States Patent
Bil et al.

(10) Patent No.: US 7,399,163 B2
(45) Date of Patent: Jul. 15, 2008

(54) ROTOR BLADE FOR A COMPRESSOR OR A GAS TURBINE

(75) Inventors: Eric Stephan Bil, Chartrettes (FR); Chantal Gisele Giot, Combs la Ville (FR); Thomas Schlesinger, Suresnes (FR)

(73) Assignee: SNECMA, Paris (FR)

( * ) Notice: Subject to any disclaimer, the term of this patent is extended or adjusted under 35 U.S.C. 154(b) by 512 days.

(21) Appl. No.: 11/206,156

(22) Filed: Aug. 18, 2005

(65) Prior Publication Data
US 2007/0292271 A1 Dec. 20, 2007

(30) Foreign Application Priority Data
Aug. 23, 2004 (FR) .................................. 04 09036

(51) Int. Cl.
*F01D 11/00* (2006.01)
(52) U.S. Cl. .................................. 416/193 A
(58) Field of Classification Search ............ 416/193 A, 416/244 R, 244 A, 248
See application file for complete search history.

(56) References Cited

U.S. PATENT DOCUMENTS

| | | | | |
|---|---|---|---|---|
| 5,924,699 A | * | 7/1999 | Airey et al. | 416/193 A |
| 6,171,058 B1 | * | 1/2001 | Stec | 416/193 A |
| 7,214,034 B2 | * | 5/2007 | Giot et al. | 416/193 A |

OTHER PUBLICATIONS

U.S. Appl. No. 11/206,156, filed Aug. 18, 2005, Bil et al.
U.S. Appl. No. 11/206,155, filed Aug. 18, 2005, Bil et al.

* cited by examiner

*Primary Examiner*—Igor Kershteyn
(74) *Attorney, Agent, or Firm*—Oblon, Spivak, McClelland, Maier & Neustadt, P.C.

(57) ABSTRACT

Rotor blade for a compressor or a gas turbine, in particular for a turbojet engine, including a suction side and a pressure side, which are joined at their upstream ends by a leading edge and at their downstream ends by a trailing edge for the gases, a platform connecting the suction side and the pressure side to a blade root, and a stiffener formed beneath the downstream part of the platform and including at least one notch or a cut-away in line with the trailing edge, in order to reduce the stresses in the joint region between the aerofoil and the platform.

14 Claims, 2 Drawing Sheets

ROTOR BLADE FOR A COMPRESSOR OR A GAS TURBINE

The present invention relates to a rotor or stator blade for a compressor or a gas turbine, and to a turbojet or industrial compressor or turbine comprising a plurality of these blades.

BACKGROUND OF THE INVENTION

A rotor or stator blade for a compressor or a gas turbine has a convex outer surface or suction side and a concave inner surface or pressure side, which are joined at their upstream ends by a leading edge and at their downstream ends by a trailing edge for the gases. The pressure side and the suction side are attached to a platform, which is provided with a blade root of the dovetail, fir-tree or similar type, intended to be inserted into a corresponding cavity in a rotor disc of the compressor or the gas turbine.

A lateral reinforcing web called a "stiffener" is formed beneath the platform, between an inner surface of the latter and a lateral surface of the blade root, and extends transversely beneath a downstream part of the platform. If necessary, another stiffener is also formed beneath an upstream part of the platform.

These stiffeners serve also as support for a sealing skirt placed between two adjacent blades in order to prevent flow of air from the internal part of the turbine radially towards the pressure and suction sides of the blades and, conversely, to prevent flow of gas or air from the pressure and suction sides of the blades as far as the internal part of the gas turbine. The cool air from the internal part can thus enter air intake orifices provided at the end of the blade roots and supplying a network of ventilation ducts formed on the inside of the blades, in order to cool them.

When the compressor or turbine is in operation, the pressure and suction sides of the blades, which are subjected to centrifugal forces, have a tendency to move radially outwards. The centrifugal forces therefore generate large forces in the joint region between the blade aerofoil and the platform, and create high stresses in this joint region and more particularly in the joint between the blade trailing edge and the platform.

These stresses are liable to weaken the blades and reduce their lifetime.

The object of the invention is in particular to provide a simple, inexpensive and effective solution to this problem.

The subject of the invention is a compressor or gas turbine blade in which the loads applied by the centrifugal forces to the joint region between the aerofoil and the platform of the blade are limited.

SUMMARY OF THE INVENTION

For this purpose, the invention proposes a rotor or stator blade for a compressor or a gas turbine, comprising a convex outer surface or suction side and a concave inner surface or pressure side, which are joined at their upstream ends by a leading edge and at their downstream ends by a trailing edge for the gases, a platform connecting the suction side and the pressure side to a blade root, and at least one stiffener formed by a flat web of material joining the downstream part of the platform to the blade root, this stiffener extending perpendicular to the platform and transversely or circumferentially with respect to the axis of the rotor, wherein, to reduce the stresses in the joint region where the trailing edge joins the platform, the stiffener includes at least one notch or cut-away formed substantially level with the trailing edge.

This notch or cut-away, formed level with the trailing edge, gives the stiffener, and therefore the platform, relative flexibility in this region, which thereby allows them to deform slightly and to follow the deformation of the trailing edge when the blade is subjected to the centrifugal forces. This results in a substantial reduction in the stresses in the joint region between the aerofoil and the platform of the blade and increases the lifetime of the latter.

In addition, a major portion of the stiffener is preserved, so that it still fulfils its function of supporting the sealing skirt.

In a first embodiment of the invention, the cut-away is formed in that end of the stiffener which lies substantially in line with the trailing edge.

The cut-away may extend over part or substantially the entire height of the stiffener between its radially internal edge and the platform and/or extend transversely or circumferentially over a fraction of the length of the stiffener.

In a second embodiment of the invention, a notch is formed in the radially internal edge of the stiffener and extends as far as a point close to the platform. Any shape of this notch, for example with straight, oblique or curved edges, is possible.

In operation, that end of the stiffener which lies in line with the trailing edge forms a mass, which is deformed at the same time as the pressure and suction sides of the blade. This makes it possible for the downstream part of the platform to deform more easily and to better follow the deformation of the pressure and suction sides, and therefore to further limit the stresses in the region where they join the platform.

The cut-away or notch in the stiffener can be produced by machining or by casting with the blade.

The invention also proposes a turbojet or industrial turbine, wherein it comprises a plurality of blades, the stiffeners of which include at least one aforementioned notch or cut-away.

The invention also proposes a turbojet or industrial compressor equipped with blades of the aforementioned type.

The invention also relates to a turbomachine, such as an aircraft turbojet or turboprop engine, wherein it comprises a plurality of blades of the aforementioned type.

BRIEF DESCRIPTION OF THE DRAWINGS

Other advantages and features of the invention will become apparent on reading the following description given by way of non-limiting example and with reference to the appended drawings in which.

DESCRIPTION OF THE PREFERRED EMBODIMENT

Figure 1:
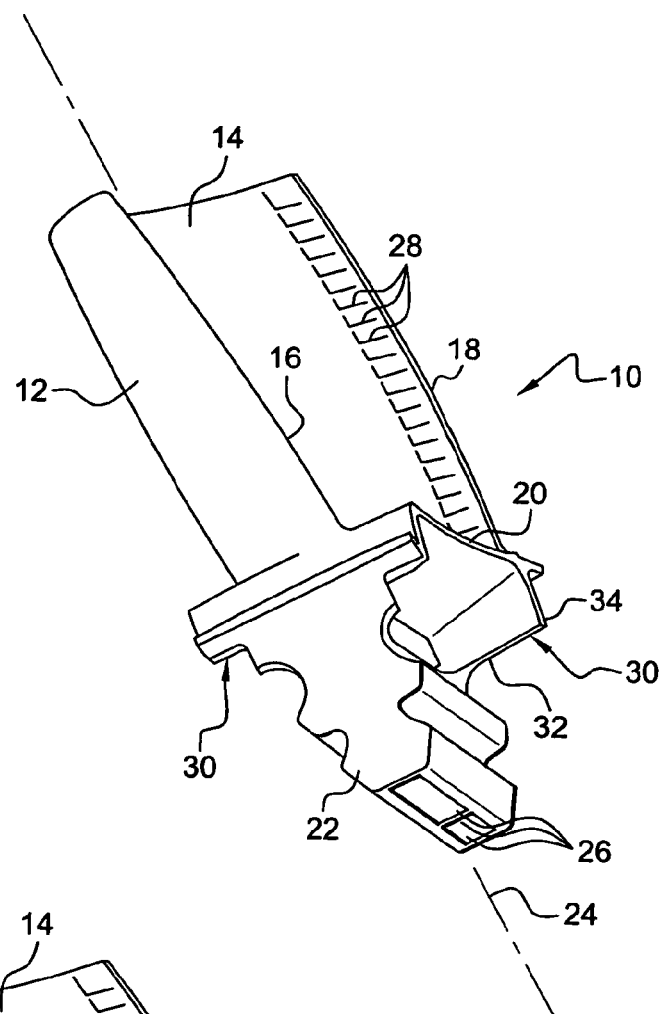
FIG. 1 is a perspective schematic view of a rotor blade of the known art, seen from below and from the upstream side.

Referring first to FIG. 1, this shows a rotor blade 10 for a compressor or a gas turbine, in particular for a turbojet engine, according to the prior art.

This blade 10 includes an aerofoil attached to a platform and having a convex outer surface or suction side 12 and a concave inner surface or pressure side 14 which are joined at their upstream ends by a leading edge 16 and at their downstream ends by a trailing edge 18 for the gases that flow through the compressor or the gas turbine.

The aerofoil of the blade 10 is joined via the approximately rectangular platform 20 to a root 22 by means of which the blade 10 is mounted on a rotor disc (not shown) for the compressor or the gas turbine, by this root 22 being fitted into a cavity of corresponding shape on the periphery of the rotor disc.

Thanks to this male/female fitting, which is of the fir-tree type in the example shown, the blade 10 is retained radially on the rotor disc. Other means are provided for axially fastening the root 22 of the blade 10 in the cavity of the disc.

Each rotor disc comprises a plurality of blades 10 uniformly distributed around its external periphery and cooperating with stages of fixed stator blades placed between two rotor discs.

The blade 10 is internally ventilated and cooled by means of air circulation ducts, which extend parallel to the longitudinal axis 24 of the blade 10 and are supplied via orifices 26 that open into the end of the root 22 of the blade 10. Air outlet slits 28, supplied by this network of ducts, are formed on part of the pressure side 14 close to the trailing edge 18.

The platform 20 is also connected to the blade root 22 via flat webs called stiffeners 30, which extend beneath the platform 20 at its upstream and downstream ends, approximately perpendicular to the platform 20 and transversely or circumferentially with respect to the axis of rotation when the blade 10 is mounted on a rotor disc.

The downstream stiffener 30 is located beneath the junction between the trailing edge 18 and the platform 20 and includes a radially internal edge 32, approximately parallel to the platform 20 and connected to the blade root 22, and a lateral edge 34 approximately perpendicular to the platform 20 and connected to the corresponding edge of the platform 20.

On each side of the platform 20, the two stiffeners 30 define between them a housing for a sealing skirt (not shown), which is placed beneath the platform 20 and extends between this blade 10 and the adjacent blade on the rotor disc.

These sealing skirts prevent the flow of air from the internal part of the turbine or compressor radially outwards between the platforms 20 of the adjacent blades, and conversely prevent the flow of air or gas from the outside towards the internal part of the compressor or gas turbine. The cool air from the internal part may thus enter the orifices 26 in the roots 22 of the blades 10.

The stiffeners 30 also stiffen the platform 20 and prevent it from bending outwards about an axis parallel to the rotation axis.

In operation, when the blades 10 are subjected to large centrifugal forces, which create high loads, especially in the joint regions where the aerofoils join the platforms 20, the platforms 20 stiffened by the stiffeners 30 withstand these loads, which generates stresses in these joint regions.

To limit the stresses, the invention proposes to form at least one notch or cut-away in that part of the downstream stiffener 30 which lies beneath the joint between the trailing edge 18 and the platform 20.

Figure 2:
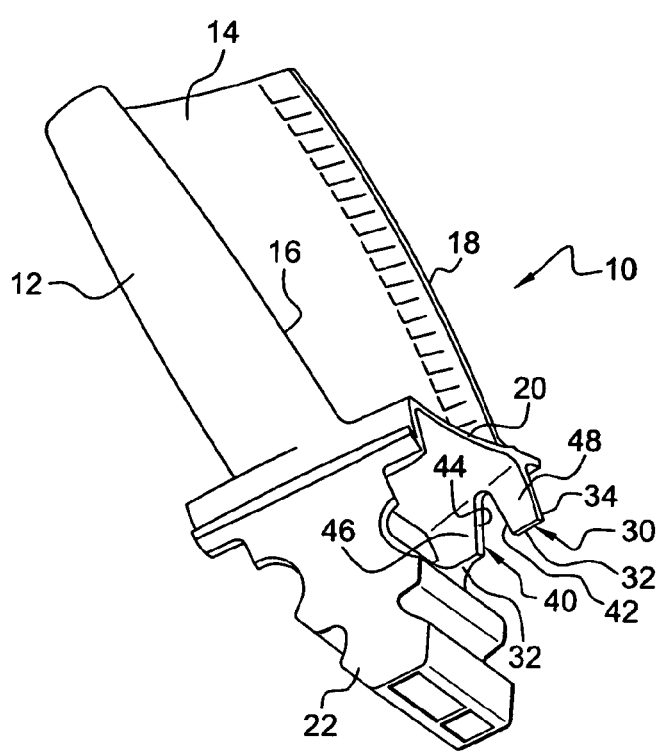
FIG. 2 is a perspective schematic view of a rotor blade according to the invention, seen from below and from the upstream side.

FIG. 2 shows a first embodiment of the invention, in which the stiffener 30 includes a notch 40 that extends from its radially internal edge 32 as far as a point close to the platform 20. This notch may have any shape, with straight, oblique or curved edges. In the example shown, this notch 40 has substantially the shape of an inverted V and has an edge 42, approximately perpendicular to the platform 20 and parallel to the lateral end edge 34 of the stiffener 30, and an edge 44 which is oblique to the platform 20 and connects the upper end of the edge 42 near the platform 20 to the radially internal edge 32 of the stiffener 30.

The stiffener 30 therefore comprises two separate parts, namely a part 46, which joins the platform 20 to the blade root 22 and is intended to stiffen the platform 20, and another part 48 located at the end of the stiffener 30 beneath the joint region where the trailing edge 18 joins the platform 20 and capable of deforming when it is subjected to the centrifugal forces and serving as a support for a sealing skirt. This part 48 of the stiffener 30 can follow the deformation of the joint between the trailing edge 18 and the platform 20.

Figure 3:
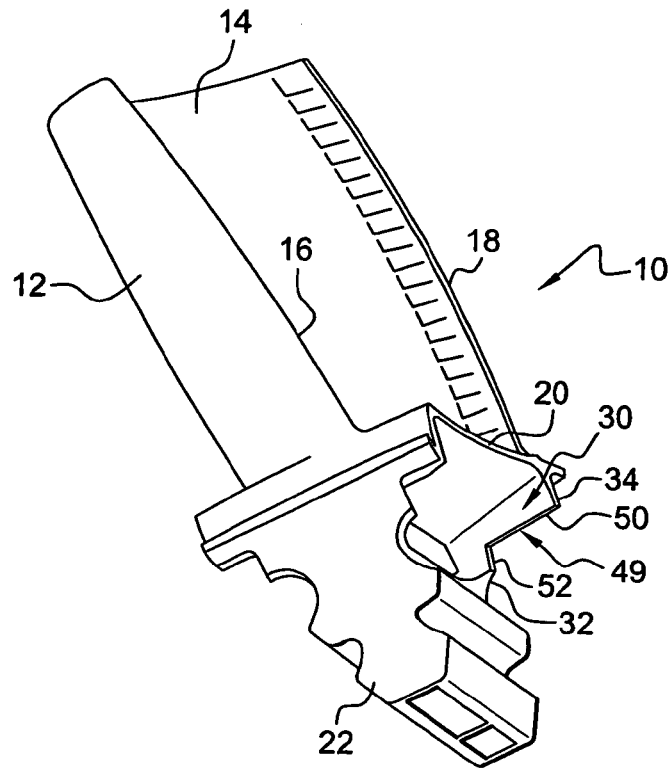
FIG. 3 is a perspective schematic view of an alternative embodiment of the rotor blade according to the invention, seen from below and from the upstream side.

FIG. 3 shows a second embodiment of the invention, in which the lateral edge 34 of the stiffener 30 joined to the edge of the platform 20 includes a cut-away 49 which extends over part of the height of the stiffener 30 from its radially internal edge 32 and over a fraction of the length of the stiffener 30 in the transverse or circumferential direction. This cut-away may have any shape, with straight, oblique or curved edges. In this example, the stiffener 30 has substantially the form of a L with an edge 50, parallel to the platform 20 and joined to the remaining part of the lateral edge 34 of the stiffener 30, and with a straight or oblique edge 52, which is joined to the remaining part of the radially internal edge 32 of the stiffener 30.

The cut-away 49 of the stiffener 30 makes it possible for the downstream part of the platform 20 lying beneath the trailing edge 18 to deform when the compressor or turbine is in operation and reduces the loads exerted on the region where it joins the platform 20.

Figure 4:
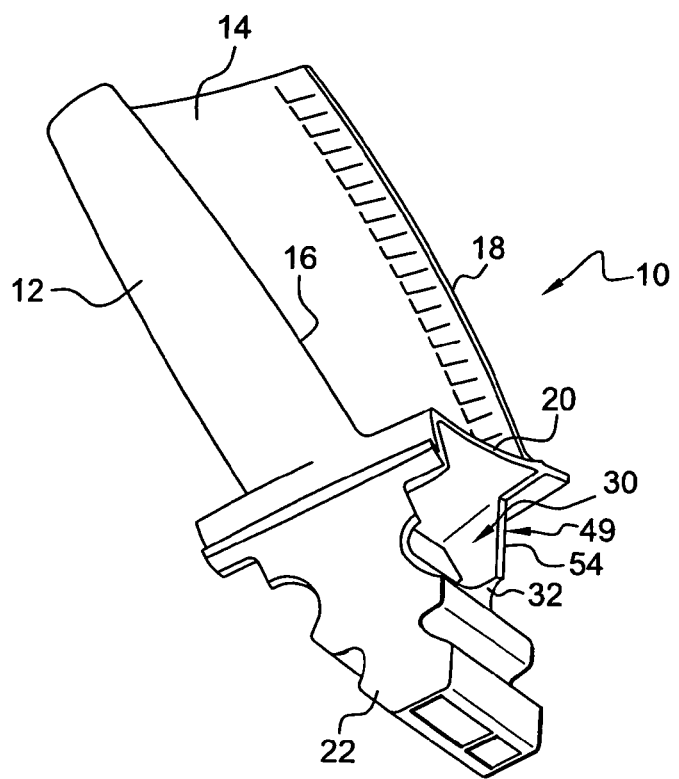
FIG. 4 is a perspective schematic view of another alternative embodiment of the rotor blade according to the invention, seen from below and from the upstream side.

In the alternative embodiment shown in FIG. 4, the cut-away 49 extends from its radially internal edge 32 over substantially the entire height of the stiffener 30. In this example, the stiffener 30 has a trapezoidal shape with an edge 54 that is oblique to the platform 20 and connects the latter to the remaining part of the radially internal edge 32 of the stiffener 30. This trapezoidal part essentially corresponds to the part 46 of the embodiment shown in FIG. 2 and has the function of stiffening the platform. That part of the platform 20 which lies beneath the trailing edge 18 has less mass than in the example shown in FIG. 2 and is slightly less sensitive to the centrifugal forces, while still having a certain flexibility, owing to the local suppression of the stiffener 30.

The notch 40 or the cut-away 49 of the stiffener is produced by machining or by casting.

Simulation calculations have shown that the invention significantly extends the lifetime of the gas turbine blades of turbojet engines.

What is claimed is:

1. Rotor blade for a compressor or a gas turbine, comprising a convex outer surface or suction side and a concave inner surface or pressure side, which are joined at their upstream ends by a leading edge and at their downstream ends by a trailing edge for the gases, a platform connecting the suction side and the pressure side to a blade root, and at least one stiffener formed by a flat web of material joining the downstream part of the platform to the blade root, this stiffener extending perpendicular to the platform and transversely or circumferentially with respect to the axis of the rotor, wherein, to reduce the stresses in the joint region where the trailing edge joins the platform, the stiffener includes at least one notch or cut-away formed substantially level with the trailing edge.

2. Blade according to claim 1, wherein said cut-away is formed in that end of the stiffener which lies substantially in line with the trailing edge.

3. Blade according to claim 2, wherein said cut-away extends over substantially the entire height of the stiffener between its radially internal edge and the platform.

4. Blade according to claim 3, wherein said cut-away has straight, oblique or curved edges.

5. Blade according to claim 2, wherein said cut-away extends from its radially internal edge over part of the height of the stiffener.

6. Blade according to claim 5, wherein said cut-away has straight, oblique or curved edges.

7. Blade according to claim 2, wherein said cut-away extends transversely or circumferentially over a fraction of the length of the stiffener.

8. Blade according to claim 1, wherein the stiffener includes a notch formed in its radially internal edge and extending as far as a point close to the platform.

9. Blade according to claim 8, wherein said notch has straight, oblique or curved edges.

10. Blade according to claim 8, wherein the notch includes an edge approximately perpendicular to the platform and close to that end of the stiffener which lies substantially in line with the trailing edge, and an edge that is oblique to the platform.

11. Blade according to claim 1, wherein the cut-away or notch is produced by machining or by casting.

12. Turbojet or industrial turbine, wherein it comprises a plurality of blades according to claim 1.

13. Turbojet or industrial compressor, wherein it comprises a plurality of blades according to claim 1.

14. Turbomachine, comprising a plurality of blades according to claim 1.

* * * * *